United States Patent [19]
Chapalain

[11] Patent Number: 4,993,769
[45] Date of Patent: Feb. 19, 1991

[54] SLING STRAP

[76] Inventor: Jean-Philippe G. C. Chapalain, Les Naïades 306 Parvis de la Prěfecture, 95000 Cergy Prefecture, France

[21] Appl. No.: 345,488

[22] Filed: May 8, 1989

[51] Int. Cl.[5] ........................ B66C 1/12; A44B 11/12; F16G 11/00
[52] U.S. Cl. ........................................ 294/74; 24/71.2
[58] Field of Search ................ 294/74, 75; 24/68 CD, 24/71.1, 71.2, 269, 71.3; 254/213, 214, 215, 221; 410/100

[56] References Cited

U.S. PATENT DOCUMENTS

| | | | |
|---|---|---|---|
| 2,642,639 | 6/1953 | Meigham et al. | 24/71.2 X |
| 2,710,436 | 6/1955 | Davis | 410/100 X |
| 3,306,552 | 2/1967 | Nakolan | 24/71.2 X |
| 3,826,473 | 7/1974 | Huber | 24/68 CD X |
| 4,199,182 | 4/1980 | Sunesson | 294/74 X |

FOREIGN PATENT DOCUMENTS

| | | | |
|---|---|---|---|
| 205607 | 1/1968 | U.S.S.R. | 24/68 CD |

*Primary Examiner*—Margaret A. Focarino
*Assistant Examiner*—Dean J. Kramer
*Attorney, Agent, or Firm*—Wolf, Greenfield & Sacks

[57] ABSTRACT

A sliding strap for lifting loads wherein a strap is connected to a shackle providing a hook engaging loop and the strap at one end is fed into a rotatable assembly provided with two juxtaposed carrying pins spaced to provide a passage therebetween, and a receiving pin. The carrying pins passage permits the strap to pass therethrough. The receiving pin is aligned with this passage to allow the strap to loop around the receiving pin and pass through the passage. Rotation of the assembly serves to wrap the doubled strap around the three pins. Flanges are provided fixed to the rotatable assembly. A series of holes are provided in the flanges and in the shackle to permit the insertion of a locking pin when a pair of flange holes are aligned with a pair of the shackle holes.

15 Claims, 5 Drawing Sheets

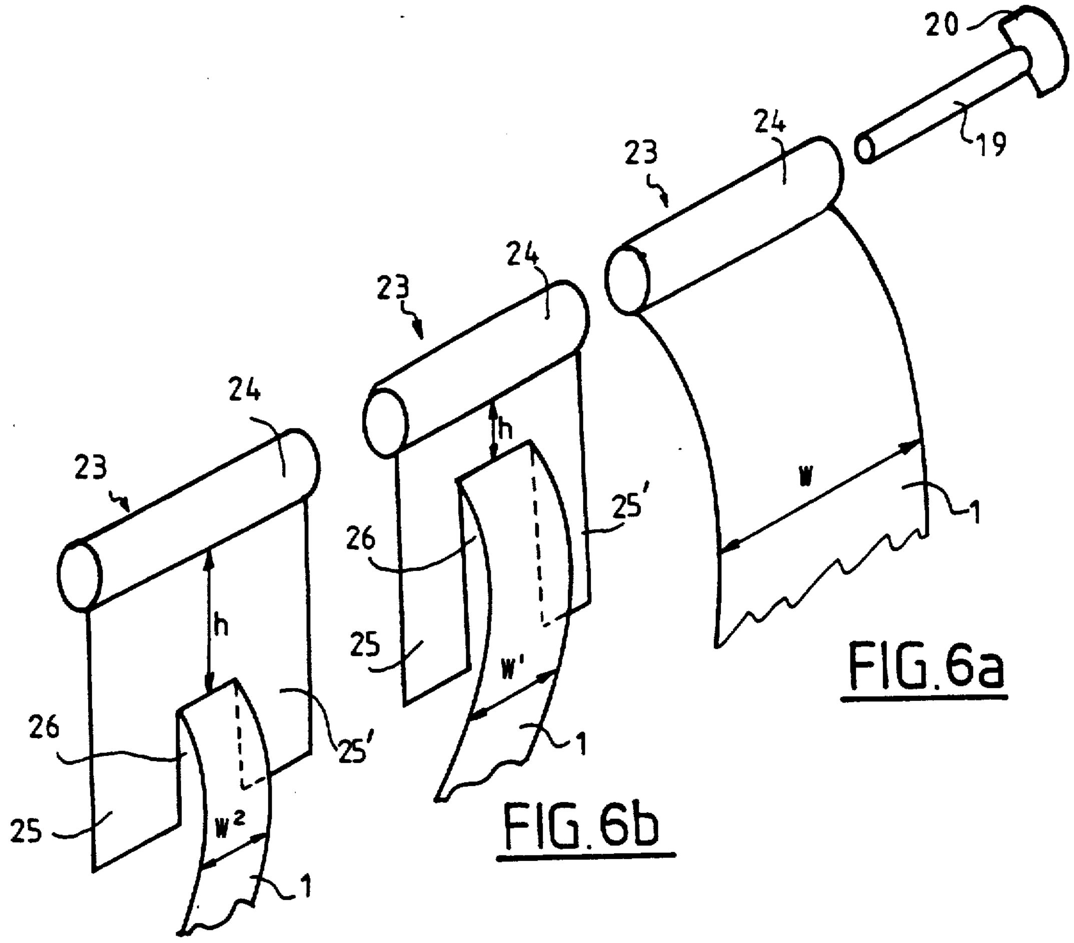
FIG. 6a
FIG. 6b
FIG. 6c
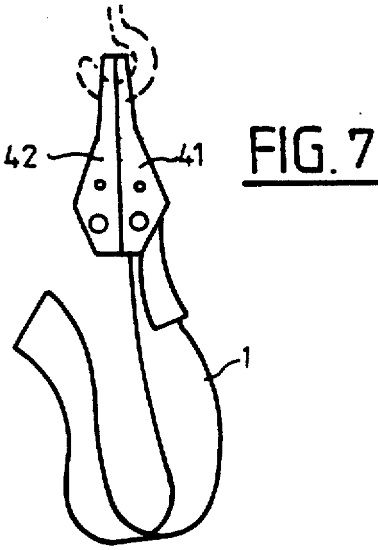
FIG. 7
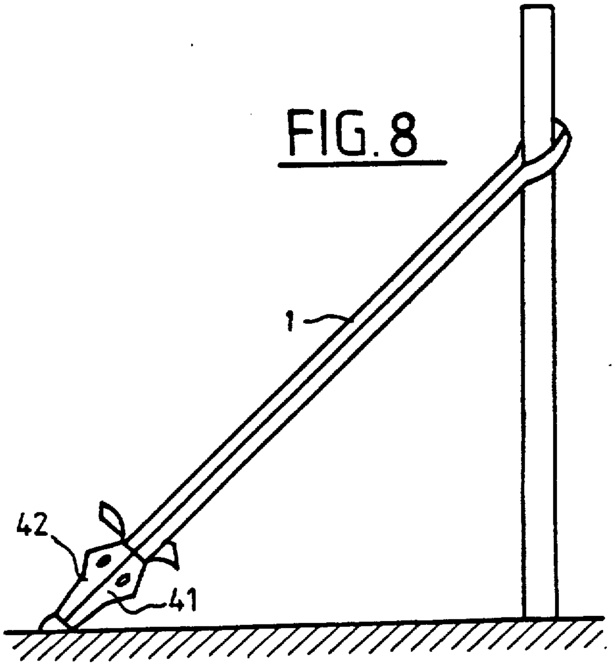
FIG. 8

SLING STRAP

BACKGROUND OF THE INVENTION

The present invention concerns a sling strap intended to allow the lifting and handling of objects or loads particularly with the help of appropriate machines such as gantry cranes, hoists etc.

Sling straps are conventionally made up from metal shackles around which the ends of the straps are secured by stitching. Such straps are far from being totally satisfactory, due to relatively long delays in delivery and manufacture connected with the obligatory use in the factory of a sewing machine and, above all, due to the fact that, once sewn, the length of the strap is fixed, and offers no possibility of adjustment; it is therefore always necessary to have in stock a lot of sling straps of different lengths, which also considerably increases their manufacturing cost.

Moreover, the act of sewing leads to a certain amount of deterioration of the strap due to the thread being cut by the switching. This in turn leads to a diminution in the maximum working load.

It is therefore one object of the present invention to overcome these deficiencies by providing a sling strap made up of a flat strap and at least one rigid shackle stirrup fixed to at least one of the ends of the strap, which can be set in place, without stitching, and whose length may be adjusted almost instantly, without requiring any tools. In addition, it is desirable that such sling strap have a resistance to tension at least equal to that of the arrangements used in the prior art.

SUMMARY OF THE INVENTION

According to the invention, the rigid stirrup which is advantageously integrally hot-forged from a high strength alloy steel, comprises means for receiving the end of the strap co-operating with means for positioning and guiding it and with means of clamping the assembly thus formed.

The sling strap is characterised in that the stirrup includes two side members each provided with bores in which is journalled a rotatable assembly made up of two positioning discs connected by a receiving pin which forms an integral part of the strap end receiving means and around which the end of the strap is wound and brought back at 180°. Also, on both sides of the receiving pin and parallel thereto there are two carrying pins defining between them a guide slot into which the end of the strap passes and is aligned at right-angles to the receiving pin. The assembly formed by the rotatable positioning discs and the carrying pins constitute the means of positioning and guiding the strap.

It is clear that the preliminary positioning of the strap, is extremely simple and needs no tools; it is necessary only to make sure that the loose end of the strap is of sufficient length.

The receiving pin has a circular cross-section, and the carrying pins are arranged symmetrically in relation to it, and have for example a cross-section of part-circular shape so as to define between them a rectilinear guide slot. This particular shape must in no way be considered to be limitative and could be different without thereby departing from the scope of the invention; one could for example opt for carrying pins each made up of two identical circular pins.

In order to facilitate the rotation operation of the triple pin, one of the positioning discs or the first positioning disc is preferably fitted with a winding key.

According to another characteristic of the invention, there are clamping means provided which will positively retain the strap in wound up position. Such clamping means includes attached to the rotatable assembly and respectively having holes which may be aligned with corresponding holes on the stirrup, and further includes a locking pin able to be introduced into the holes of the stirrup and of the rotatable assembly when they are aligned in order to clamp the latter against rotation.

The ears are fixed to the positioning discs on the inside of the stirrup, directly against its sides, so as to form an element with optimum rigidity. In order to allow its positioning and fixing, the locking pin is equipped at one end with a studded head and at the other end with a thread which cooperates with a thread provided in some of the holes of the stirrup.

The mounting on the same rotating disc of the three pins forming a triple pin allows an increase in the rigidity of the assembly forming the locking zone, the elimination of the phenomenon of flexure in the pin and increasing the moment of inertia.

According to this configuration, the forces distribute themselves primarily in the triple pin and the balance of the forces pass through the fourth pin, i.e., the locking pin.

The receiving means provides an entry slot for the strap which is essentially parallel to the receiving pin, and the two ends of the strap are returned through the entry slot after winding around the receiving pin.

For reasons of ease of manufacture and consequently reducing the cost price of the equipment, the entry slot is most usually defined by two entry pins arranged parallel to the receiving pin at the end of the stirrup opposite the shackle and hence the lifting zone.

In accordance with the above-mentioned configuration, in order to position the strap on the stirrup, it is first introduced by one of its ends into the entry slot before winding it around the receiving pin and then passing its end through the entry slot again. Then, the triple rotatable pin is turned in such a way that the strap starts to cover one of the carrying pins and then the second. The rotation of the assembly is maintained until the holes of the ears and of the stirrup are opposite each other, which corresponds to a total rotation of about 540 degrees. Thereafter the system is clamped in this position by tightening the locking pin.

This configuration has the advantage that the arrangement is perfectly symmetrical and the direction of rotation of the triple pin is therefore unimportant.

In order to be anchored satisfactorily, it is necessary to ensure that the loose end of the strap overruns the stirrup by at least twenty centimeters.

According to the invention, the locking pin has in fact a dual role; in effect, it ensures the clamping of the device and, at the same time, avoids the rejection of the strap at its upper part by assuring its hold.

In addition, it is essential that, once positioned, the strap should not slip sideways and consequently, its width should correspond exactly to that of the pins around which it is locked.

According to another characteristic of the invention, in order to allow for the adaptation of the stirrup to straps of different thicknesses and different widths (the variable elements of its geometry), the stirrup is provided with a regulating element made up of a tubular element of essentially the same length as the locking pin which it is intended to receive as well as, if necessary, two flaps fixed to the tubular element approximately perpendicular to it and defining between them a gap corresponding to the width of the strap to be fitted.

This tubular element has the advantage that it avoids the rejection of the strap and thus acts as a sort of control or gauge which locates the strap widthwise in the system.

The diameter of the tubular element is a dependent variable of the thickness of the strap: in the particular case of very thin straps, one uses a thick tube to obtain a wedging effect such as to maintain the strap permanently in its working axis and therefore accommodate under-tension or over-tension of the strap.

In the case of straps which are significantly thicker, it is of course necessary to reduce the section of this tubular element correspondingly.

In all cases, the regulatory element presses on the strap and on the triple pin preventing rejection.

It is clear that the strap is thus perfectly maintained laterally by the regulatory element.

The sling strap of the invention has a number of possible applications such as for lifting, bracing, stowing or it can even be used in the field of tension systems (floating strap for anti-pollution barrier, for oceanographic spacial location, for sailing, etc. . .) and therefore is able to be used at sea, on land or in the air. It may also be transformed into a sliding-sling by the addition of a hook with a keeper, or may even be arranged in pairs so as to obtain a double-tension system.

The strap does not undergo any deterioration in any of the fibres during fastening or undoing, while in the conventional prior art devices employing stitching, there is a minimum loss of 20% of the fibres (cutting by sewing/stitching). This new sling-strap consequently is at least 20% more efficient.

To obtain the optimum strength, the stirrup assembly as well as the triple pin, the ears and the locking pin must be made of a high-performance material, such as noble alloy steel.

Another advantage of the sling-strap of the invention, is that because of its symmetry, two active ends of a strap can be used, thus allowing the lifting of more voluminous loads from two gripping points (two-ended sling).

In the case of a symmetrical load, in order to obtain a sling with two active ends, it is sufficient to wind and lock the strap in its usual position, then to pass the two ends above the entry pins and not through the entry slot as in the case of the single-ended sling, in order to allow the obtention of an angle $\alpha$ between the two ends and finally to attach to the lower ends of these latter a strap hook and to fit these two accessories onto the two ends thus formed so that the tensile force may be divided equally between the two ends in relation to the centre of gravity of the load.

In the case of a non-symmetrical load, it is advantageous to adjust the length of the two ends before winding and positioning the locking clip so that the device is thus in effect able to be slid, which allows it to be easily positioned on the axis of gravity. This position having been established, it remains only to wind and lock the strap and to make the final adjustment of its two lower ends.

BRIEF DESCRIPTION OF THE DRAWINGS

The details of the sling-strap of the invention will become more readily apparent from a reading of the description following hereafter and with reference to the accompanying drawings, in which:

FIGS. 6*a* to 6*b* and 6*c* are perspective views which show the regulatory element, FIGS. 7 and 8 are side views showing a particular configuration of the sling-strap.

DESCRIPTION OF THE PREFERRED EMBODIMENTS

Figure 1:
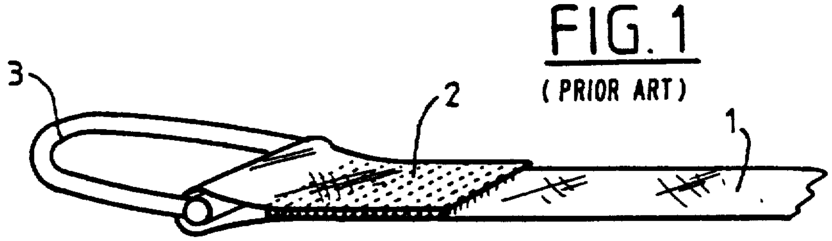
FIG. 1 (PRIOR ART)
FIG. 1 shows a sling-strap according to prior art.

According to FIG. 1, the prior art sling-straps are made from a flat strap 1 which is fixed by sewing one of its ends 2 around a ring 3 to which one may attach, for example, a hook (not shown).

Such devices of prior art are currently used particularly for lifting, bracing, or stowing and have some inconveniences principally connected on the one hand with the need to use a sewing machine in their manufacture in order to do the stitching, and on the other hand to the impossibility of regulating the length of the strap 1 (variable geometry).

Figure 2:
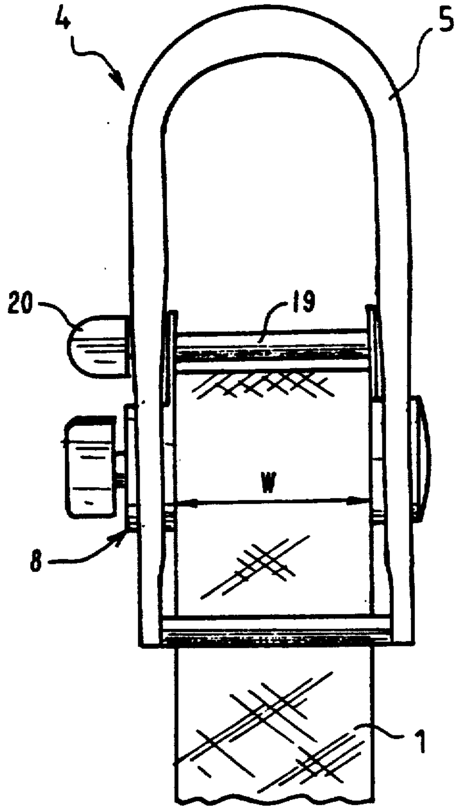
FIG. 2 is a top plan view of the sling-strap of the invention.

According to FIGS. 2 and 4, the sling-strap of the invention comprises, a rigid stirrup 4 equipped with a shackle 5 around which the end 2 of a strap 1 is wound then clamped in a particular way, which will be described in more detail hereinafter.

The configuration of the shackle 5 which defines the lifting zone of the sling-strap could of course be different without thereby departing from the scope of the invention. Although not shown in the figures, one may employ as the shackle 5 large-eyed swivels, small-eyed swivels, swivel shackles, swivel yokes or even swivel or security (latched) hooks.

Figure 3:
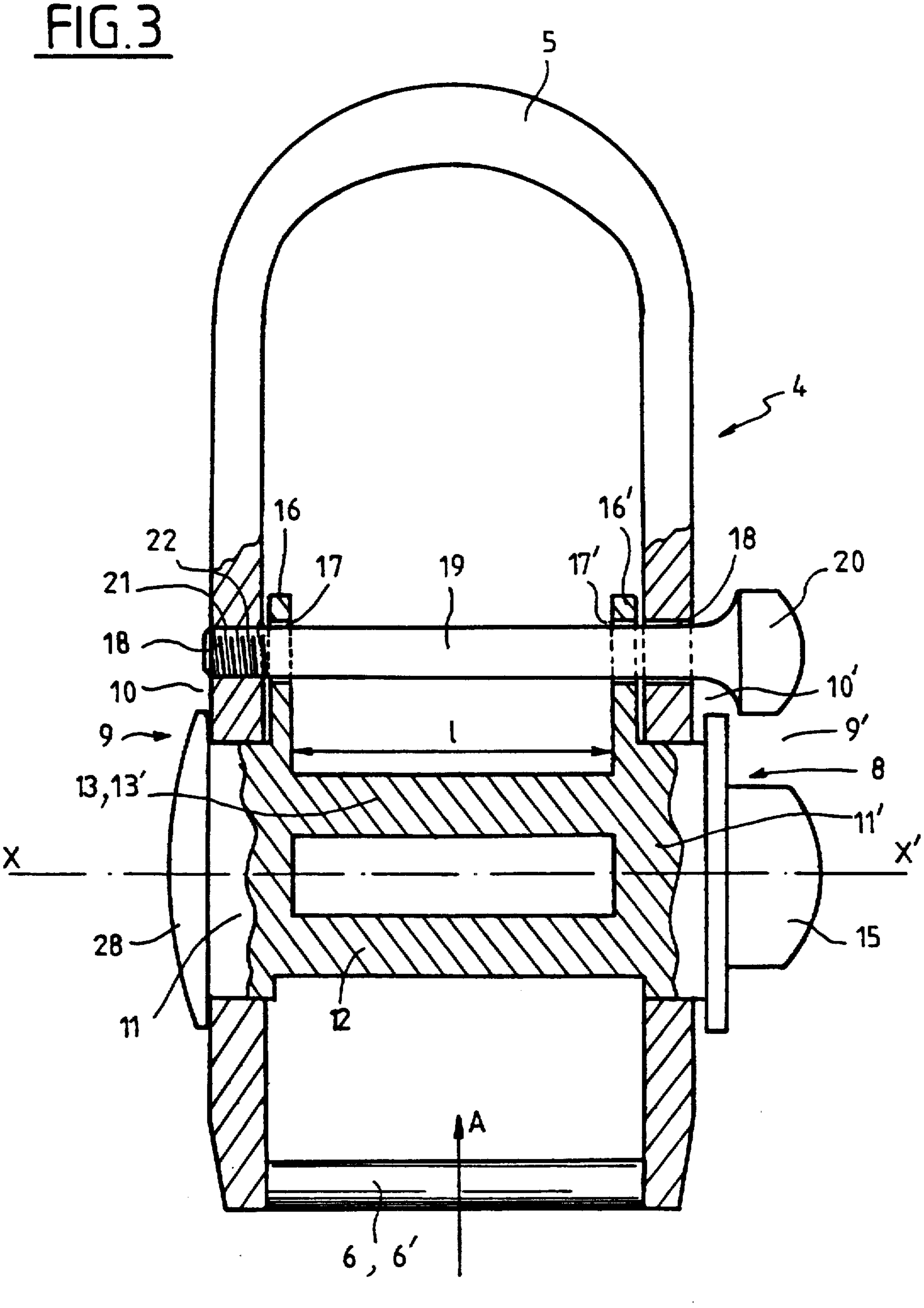
FIG. 3 is a plan view, partially in cross-section showing the shackle stirrup.
Figure 5:
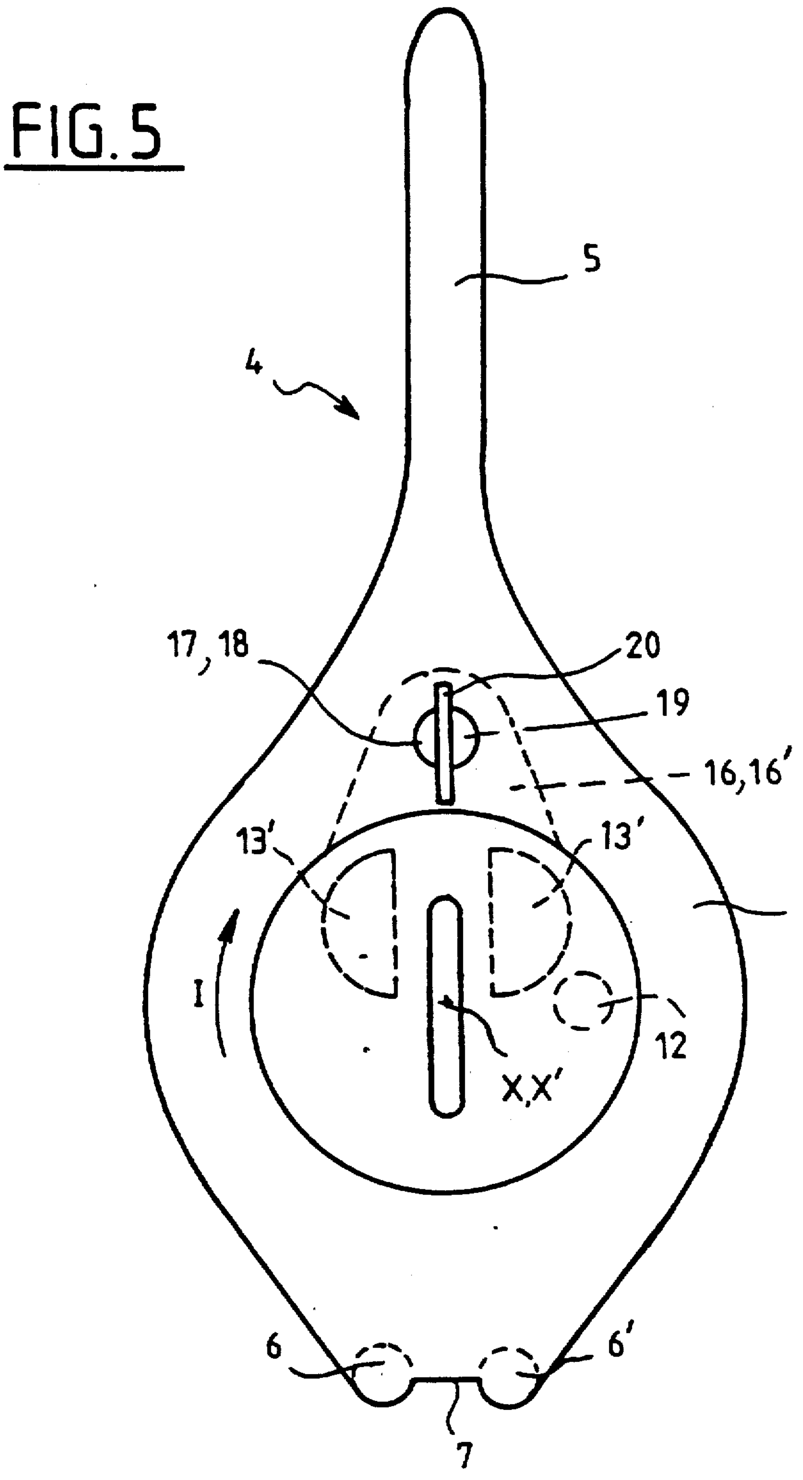
FIG. 5 is a side view similar to that of FIG. 4, in which the different pins are shown in broken lines.

According to FIGS. 3 and 5, the sling 4 with a shackle 5 is equipped, on its lower half, with two parallel entry pins 6, 6' defining between them an entry slot 7 through which the end 2 of the strap 1 is introduced into the stirrup as shown by the arrow A.

This entry slot co-operates with an assembly 8 moveable in rotation about an axis x—x' parallel to the entry pins 6, 6'. To allow the positioning of this assembly 8, which is described in more detail hereafter, the stirrup 4 is formed with side members 9, 9' (see FIG. 5) respectively fitted with circular bores 10, 10'.

Figure 5B:
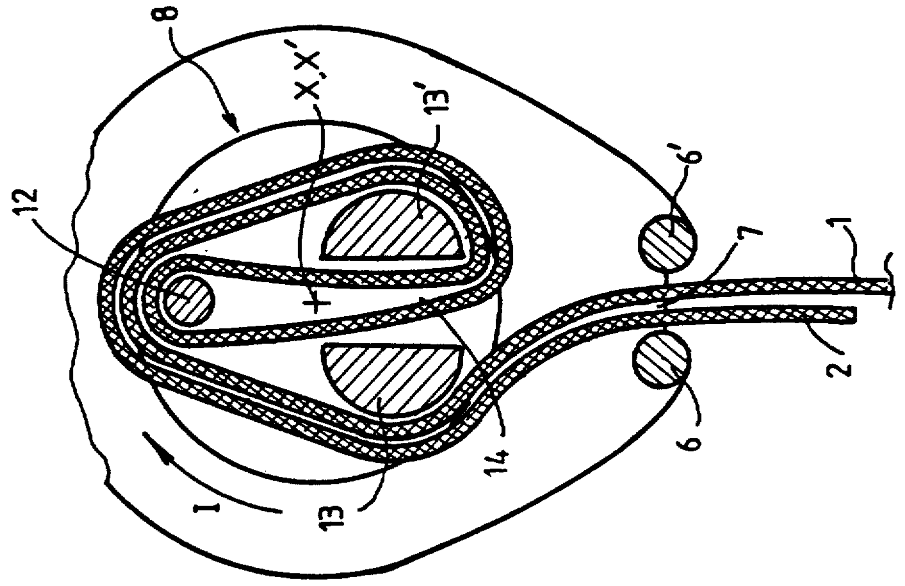
FIG. 5*b* is a view corresponding to FIG. 5*a* after turning the rotatable device 360° in the direction of arrow I.
Figure 5A:
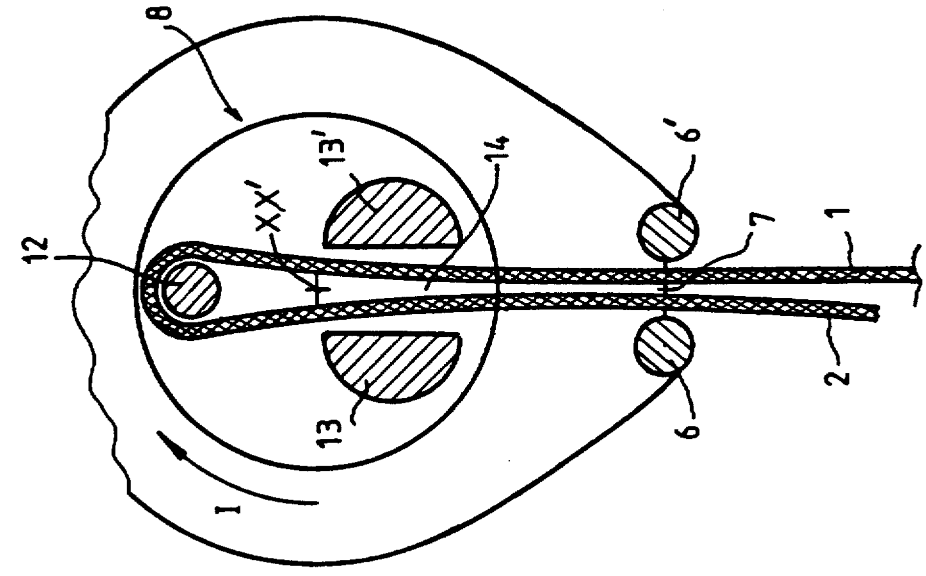
FIG. 5*a* is a schematic sectional view showing the position of the rotatable assembly during insertion of the strap
Figure 5:
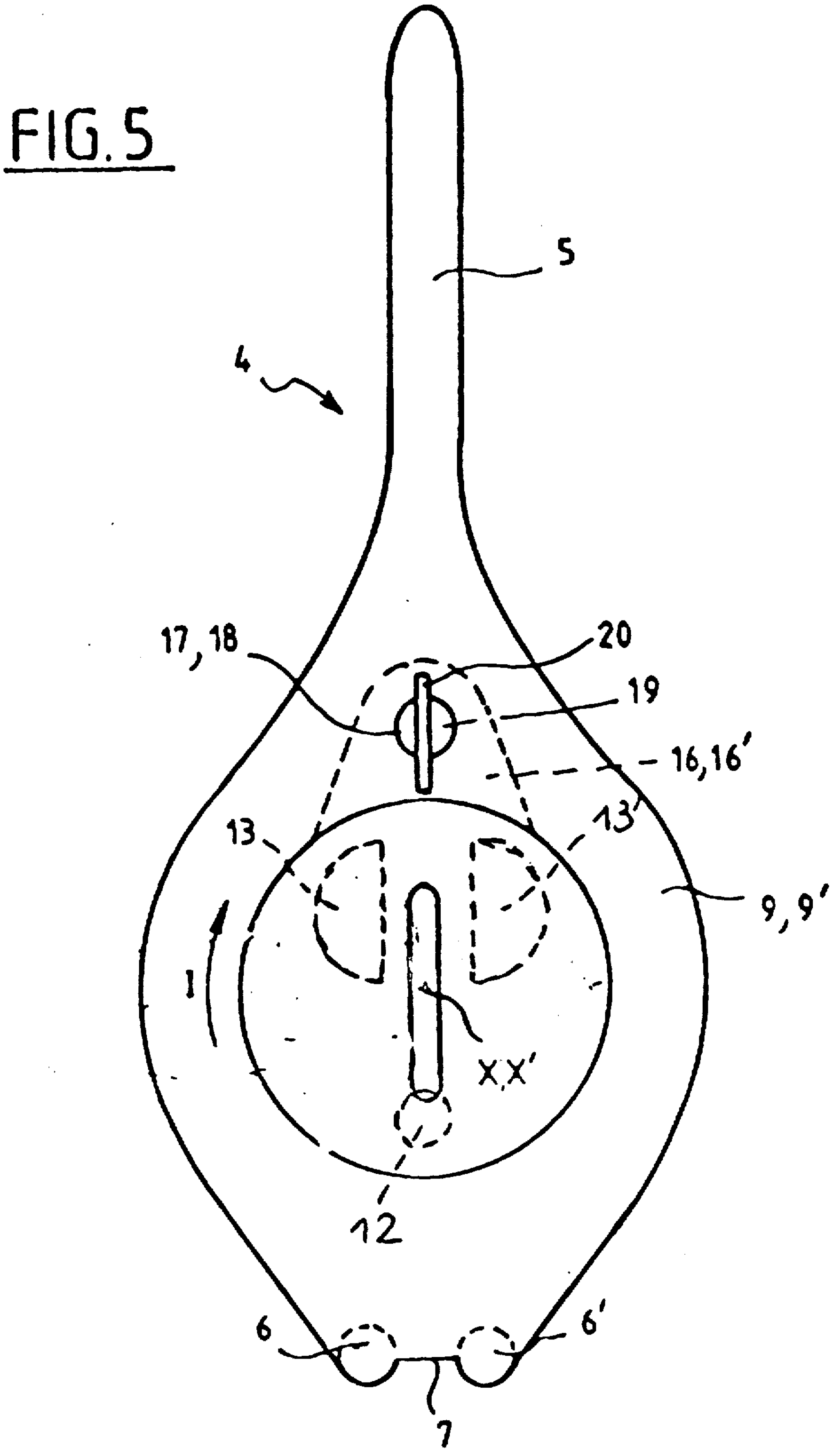

According to FIGS. 3 and 5, the rotatable assembly 8 is made up of two positioning discs 11, 11' connected on their periphery by an entry pin 12 with a circular cross-section, as well as by two carrying pins 13, 13' which have a cross-section in the shape of segments of a circle and define, between them, a rectilinear guide slot 14 which is situated at right angles to the receiving pin 12 (see FIG. 5A). A winding key 15 allows the assembly 8 to be turned manually about its rotational axis x—x'.

According to FIG. 5*a*, in order to allow the end 2 of the strap 1 to be introduced into the stirrup, the triple pin rotatable assembly 8 is placed, by moving the key 5, in a position in which the guide slot 14 is situated between the entry slot 7 and the receiving pin 12, then the end 2 of the strap 1 is wound around the pin 12 and brought back at 180° through the slots 14 and 7 so that it emerges again. It is, at this moment, necessary to ensure that the length of the free end corresponding to the end 2 is sufficient to have a good hold.

To achieve the clamping of the strap 1, the rotation of the rotatable assembly 8 with three pins 12, 13, 13' is effected according to the arrow I, the strap then winds around the carrying pins 13, 13'; after rotation through 360° around the axis x—x' from the position shown in FIG. 5*a*, the strap 1 arrives at the position shown in FIG. 5*b* in which it is more rigidly held because of the double winding around the three pins 12, 13, 13'; there is thus achieved a "self-locking" of the strap.

According to FIGS. 3 and 5, the positioning discs 11 and 11' of the rotatable assembly 8 have respectively opposite the receiving pin 12, two ears 16, 16' directly adjoining the internal surface of the side members 9, 9' of the stirrup 4.

These ears 16, 16' have holes 17, 17' intended to come into line with the holes 18, 18' in the side members 9, 9' of the stirrup 4 during the rotation of the device 8 in the direction of the arrow I about the axis x—x'.

According to FIGS. 3 and 5, the ears 16, 16' are arranged in such a way that the alignment of the perforations 17, 18, 17', 18' requires a rotation of the rotatable assembly 8 of about 180 degrees from the position shown in FIG. 5*b*. This angle of rotation—which has the advantage of conferring a perfect symmetry on the device and thus of allowing the user to turn the triple pin 8 either in the direction I or in the opposite direction—could of course be different without thereby departing from the scope of the invention.

According to FIG. 3, the presence of perforations 17, 17', 18, 18' allows the clamping in rotation of the device 8 by means of a locking pin 19 one end of which has a working head 20 while the opposite end has a thread 21 co-operating with a corresponding thread 22 provided on the inside of the hole 18 in the side member 9 of the stirrup 4.

Figure 4:
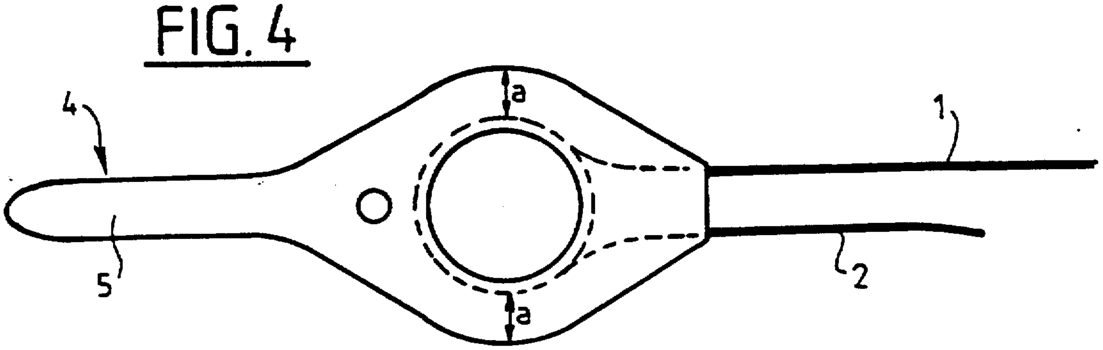
FIG. 4 is a side view of the sling-strap of the invention.

According to FIG. 4, the stirrup 4 has in fact two roles; it serves of course to permit the lifting of loads from the shackle 5; also, the zones marked a of the sides 9, 9' situated on either side of the three-pinned rotatable assembly 8 around which the strap 1 is wound ensure the protection of the latter with regard to abrasion (as opposed to the prior art device shown in FIG. 1 in which the strap is overlaid around the ring 3, which leads to abrasion at the level of this ring when the sling strap lies on the ground).

According to FIGS. 6*a*, 6*b* and 6*c*, a good grip requires that the width W of the strap 1 corresponds approximately to the length of the three pins 12, 13, 13' of the rotatable element 8 (FIGS. 2 and 3) and that this should have a thickness such that it may be perfectly held in the clamping position between the locking pin 19 and the triple pin 12, 13, 13'; a regulatory element 23 allows the sling strap to be adapted to different thicknesses or widths.

According to FIG. 6*a*, in the case of straps 1 of little thickness, it is necessary to provide around the locking pin 19 a tubular element 24 whose diameter is a variable dependent on the thickness of the strap 1 and whose length corresponds approximately to that of the three pins 12, 13, 13', this element itself thus constitutes the regulatory element 23.

According to FIG. 6*b*, if the width W' of the strap 1 becomes notably less than the length of the pins 12, 13, 13', one attaches to the tubular element 24 two guide flaps 25 and 25' fixed approximately perpendicular to this element and extending tangentially from its periphery, these flaps defining between them a gap 26 corresponding to the width W' of the strap 1 and extending into the guide slot 14 which separates the two carrying pins 13, 13'.

According to FIGS. 6*b* and 6*c*, it is of course necessary to choose a regulatory element 23 whose height h measured between the gap 26 defined by the flaps 25 and 25' and the tubular element 24 (dependent on the diameter of the tubular element 24) increases when the thickness of the strap diminishes; this zone h as well as the periphery of the tubular element 24 defines a zone which may be used for marking and identification.

The addition of the regulatory element 23 allows almost universal utilisation of the strap.

Moreover, and still without departing from the scope of the invention, one could propose appreciable modification to the configuration of the strap 1 and, as shown for example in FIGS. 7 and 8, by pairing together two stirrups $4_1$ and $4_2$ rigidly fixed together along one edge. One may thus achieve a system of double tension and thereby double load.

The configuration shown in FIG. 7 permits the use of a strap whose free end has no metal tip, which is a very good thing in certain lifting operations where the loads to be handled are delicate; this configuration can be used particularly in spatial and oceanographic fields (shells, fuselages, ice, glass, polished metal, etc. . .). No metal parts thus run the risk of hitting and damaging the load to be lifted.

According to FIG. 8, when it is applied to bracing, this twin configuration allows the passage of one doubled strap and thus doubled tension; moreover, one obtains thus a non-magnetic system given that the strap is most often made from synthetic fibres.

In the particular case of bracing, the locking pin 19 can be held in a known manner by means of a bolt and locking pin.

I claim:

1. A sling strap for lifting a load comprising:
   a flat strap having at least one end;
   a shackle assembled to the strap end and having a loop for use in connecting the strap to the load; and
   means for receiving and securing the strap end to the shackle, said securing means comprising:
      a rotatable assembly for receiving the strap end, said assembly having an axis of rotation, a pair of spaced-apart carrying pins offset from the axis of rotation and defining between them a guiding passageway, a receiving pin mounted on said rotatable assembly so that the axis of rotation lies between the carrying pins and the receiving pin and the receiving pin, the axis of rotation and the guiding passageway being aligned, whereby the strap end may be passed through the guiding passageway, wrapped around the receiving pin and then doubled-back through the guiding passageway prior to the rotatable assembly being rotated to wrap the doubled-back strap end around the carrying pins; and means for clamping the rotatable assembly to the shackle to prevent further rotation after the doubled-back strap end is wrapped around the carrying pins to a predetermined degree, said clamping means comprising a series of holes on a portion of the rotatable assembly and a series of holes on the shackle, and a locking pin having threads at one end and where some of the holes in the shackle are threaded, whereby when appropriate holes on the rotatable assembly and on the shackle are in alignment, the locking pin may be passed there-through and the threaded end of the locking pin may be threaded into mating threads in the shackle to effect locking of the rotatable assembly against further rotation and clamping of the strap end in the receiving and securing means.

2. The sling strap of claim 1 wherein the means for receiving and securing further includes an entry slot with which the guiding passageway and receiving pin may be aligned to enable ready passage of the strap end successively through the entry slot, the guiding passageway, around the receiving pin and back through the guiding passageway, and out of the entry slot.

3. The sling strap of claim 2 wherein the entry slot is formed by a pair of spaced apart entry pins which are arranged parallel to the carrying pins and receiving pin.

4. The sling strap of claim 1 in which the rotatable assembly is provided with a winding key integral therewith.

5. The sling strap of claim 1 including a tubular element mounted in the shackle through which the locking pin passes, the thickness of such element being chosen so as to accommodate straps of various thickness, whereby proper clamping may be accomplished regardless of the thickness of the strap.

6. The sling strap of claim 5 wherein a guide element is mounted on the tubular element, said guide element extending tangentially to the tubular element into the guiding passageway.

7. The sling strap of claim 6 wherein the guide element is provided with a pair of guide flaps separated by a distance equal to the width of the strap, whereby proper clamping may be accomplished regardless of the width of the strap, where such strap is narrower than the length of the carrying pins, receiving pin or locking pin.

8. The sling strap of claim 7 wherein the guide flaps are located on the guide element at a distance from the tubular element, said distance being increased as the strap used is narrower.

9. The sling strap of claim 1 wherein both ends of the strap are provided with a shackle.

10. A device for attaching a flexible, flat sling strap to a load, said device comprising:

a housing having therein a slot with a long dimension and a short dimension;

an assembly mounted within said housing and rotatable 360° with respect to said housing with an axis of rotation parallel to said long dimension, said rotatable assembly having mounted thereon a first pin extending parallel to said long dimension and a pair of second pins, each of said second pins extending parallel to said long dimension, said axis being located between said first pin and said pair of second pins; and means for fixing said rotatable assembly in a predetermined position relative to said housing in which said axis of rotation is positioned between said first pin and said slot and said pair of second pins flank a line drawn between said slot and said axis, said pair of second pins defining a passageway therebetween so that said strap can be inserted through said slot and between said pair of second pins, wrapped around said first pin and then returned through said slot, said rotatable assembly thereupon being rotated 360° and fixed to said housing to secure said strap.

11. A device according to claim 10 wherein said fixing means comprises an ear attached to said rotatable assembly and extending radially therefrom and a removable bolt passing through said ear and said housing.

12. A device according to claim 11 wherein said first pin is positioned at a predetermined distance from said bolt when said rotatable assembly is fixed to said housing, said predetermined distance being sufficiently small that when said strap is inserted into said housing and said rotatable assembly is rotated and fixed to said housing, said strap is trapped between said first pin and said bolt.

13. A device according to claim 12 further comprising a sleeve which slides over said bolt to reduce said predetermined distance in order to accommodate straps with varying thickness.

14. A device according to claim 13 further comprising means for centering said strap on said first pin and said second pair of pins in order to accommodate straps of varying width.

15. A device according to claim 14 wherein said centering means comprises a flap attached to, and extending radially from, said sleeve, said flap having a slot therein for holding said strap.

* * * * *

UNITED STATES PATENT AND TRADEMARK OFFICE

CERTIFICATE OF CORRECTION

PATENT NO. : 4,993,769

DATED : February 19, 1991

INVENTOR(S) : Jean-Philippe, et al

It is certified that error appears in the above-identified patent and that said Letters Patent is hereby corrected as shown below:

In FIG. 5, entry pin 12 should be located 90° clockwise from the 3:00 position to the 6:00 position, as the attached drawing shows.

Signed and Sealed this

Nineteenth Day of January, 1993

*Attest:*

DOUGLAS B. COMER

*Attesting Officer*

*Acting Commissioner of Patents and Trademarks*